US010936365B2

(12) United States Patent
Martin et al.

(10) Patent No.: US 10,936,365 B2
(45) Date of Patent: Mar. 2, 2021

(54) DATA PROCESSING SYSTEMS

(71) Applicant: Arm Limited, Cambridge (GB)

(72) Inventors: Samuel Martin, Cambridge (GB); Thomas James Cooksey, Cambridge (GB); Bobby Anirvan Batacharia, Cambridge (GB)

(73) Assignee: Arm Limited, Cambridge (GB)

( * ) Notice: Subject to any disclaimer, the term of this patent is extended or adjusted under 35 U.S.C. 154(b) by 32 days.

(21) Appl. No.: 16/062,952

(22) PCT Filed: Dec. 15, 2016

(86) PCT No.: PCT/GB2016/053941
§ 371 (c)(1),
(2) Date: Jun. 15, 2018

(87) PCT Pub. No.: WO2017/103590
PCT Pub. Date: Jun. 22, 2017

(65) Prior Publication Data
US 2018/0336065 A1    Nov. 22, 2018

(30) Foreign Application Priority Data
Dec. 15, 2015    (GB) .................................... 1522093

(51) Int. Cl.
*G06F 9/48*    (2006.01)
*G06F 9/50*    (2006.01)
(Continued)

(52) U.S. Cl.
CPC .............. *G06F 9/4887* (2013.01); *G06F 3/14* (2013.01); *G06F 9/48* (2013.01); *G06F 9/4806* (2013.01);
(Continued)

(58) Field of Classification Search
CPC ........ G06F 9/4887; G06F 9/5038; G06F 9/48; G06F 9/4806; G06F 9/4843; G06F 9/4881; G06F 9/50; G06F 9/5005; G06F 9/5027
See application file for complete search history.

(56) References Cited

U.S. PATENT DOCUMENTS

2005/0283534 A1    12/2005  Bigagli
2009/0305790 A1*  12/2009  Lu ......................... G06T 15/005
                                                                       463/42
(Continued)

OTHER PUBLICATIONS

PCT International Search Report dated Feb. 14, 2017, PCT Patent Application PCT/GB2016/053941.
(Continued)

*Primary Examiner* — Charles M Swift
(74) *Attorney, Agent, or Firm* — Vierra Magen Marcus LLP

(57) ABSTRACT

When performing "time warp slice" rendering for a virtual reality display, the application rendering (30) of the images required for the application that requires the virtual reality display is synchronised (35) to the display frame rate and treated as a "normal" priority task (51) in terms of its scheduling on a host processor. The time warp slice rendering (50) to render the time warp "slices" into the display buffer (21) of the display (4) for scanning out (23) as the display panel is being refreshed is effected as a "real time" priority task (58). To do this, the rendering task setup processing that must be performed on the host processor for that rendering task is scheduled using an earliest deadline first scheduling policy and is synchronised (52) to specific, recurring display events (53) that allow the "real time" priority time warp slice rendering task setup processing on the host processor to be triggered at specific points in the scan out period (23) of the display (4).

20 Claims, 4 Drawing Sheets

(51) Int. Cl.
*G06F 3/14* (2006.01)
*G09G 5/00* (2006.01)
*G06F 9/54* (2006.01)
*G06T 1/20* (2006.01)

(52) U.S. Cl.
CPC .......... *G06F 9/4843* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/542* (2013.01); *G06T 1/20* (2013.01); *G09G 5/001* (2013.01); *G06F 2209/5014* (2013.01); *G09G 2360/08* (2013.01)

(56) References Cited

U.S. PATENT DOCUMENTS

| | | | | |
|---|---|---|---|---|
| 2010/0269116 | A1* | 10/2010 | Potkonjak | G06F 9/4887 718/103 |
| 2014/0168241 | A1* | 6/2014 | Jeganathan | G06T 1/20 345/522 |
| 2014/0282572 | A1* | 9/2014 | Kang | G06F 9/4881 718/103 |
| 2015/0106819 | A1* | 4/2015 | Kim | G06F 9/5038 718/103 |
| 2015/0205632 | A1* | 7/2015 | Gaster | G06F 9/4843 718/102 |
| 2015/0293787 | A1* | 10/2015 | Bilavarn | G06F 9/4881 718/102 |
| 2016/0188491 | A1* | 6/2016 | Apodaca | G06F 12/126 711/133 |
| 2018/0146189 | A1* | 5/2018 | Park | H04N 13/344 |

OTHER PUBLICATIONS

Juri Lelli: "Providing per-task Quality of Service," Sep. 10, 2015, Retrieved from the Internet: URL:http://web.archive.org/web/20150910201311/http://linuxplumbersconf.org/2015/ocw/system/presentations/3063/original/lelli_slides.pdf.

"A Trip Down the Graphics Pipeline," Sep. 10, 2014, Retrieved from the Internet:URL:http://doc-ok.org/?p-1057.

John Carmack: "Latency Mitigation Strategies," Jul. 19, 2014, Retrieved from the Internet:URL:https://web.archive.org/web/20140719085135/http://www.altdev.co/2013/02/22/latency-mitigation-strategies/.

Michael Antonov: "Asynchronous Timewarp Examined," Mar. 3, 2015, Retrieved from the Internet:URL:https://developer3.oculus.com/blog/asynchronous-timewarp-examined/.

"Hardware Schedulers Confirmed on Latest NVidia/AMD Hardware: oculus," Jan. 1, 2015, Retrieved from the Internet:URL:https://www.reddit.com/r/oculus/comments/21722r/hardware_schedulers_confirmed_on_latest_nvidiaamd/.

John Regehr et al.: "Operating System Support for Multimedia: The Programming Model Matters OperatingSystemSupportforMultimedia: TheProgrammingModelMatters," Sep. 1, 2000, Retrieved from the Internet:URL:https://pdfs.semanticscholar.org/7e5d/79901d38b19958b6a0980c70f777d606d1b2.pdf.

"SCHED_DEADLINE—Wikipedia," Sep. 9, 2015, Retrieved from the Internet:URL:https://en.wikipedia.org/w/index.php?title+SCHED_DEADLINE&oldid=680291085.

GB Search Report dated May 24, 2016, GB Patent Application GB1522093.2.

* cited by examiner

DATA PROCESSING SYSTEMS

BACKGROUND

The technology described herein relates to data processing systems, and in particular to the operation of data processing systems that display images on a display.

FIG. 1 shows an exemplary data processing system that comprises a host processor comprising a central processing unit (CPU) 7, a graphics processing unit (GPU) 2, a video codec 1, a display controller 5, and a memory controller 8. As shown in FIG. 1, these units communicate via an interconnect 9 and have access to off-chip memory 3. In this system the GPU 2, video codec 1 and/or CPU 7 will generate frames (images) to be displayed and the display controller 5 will then provide the frames to a display 4 for display.

In use of this system, an application 10 such as a game, executing on the host processor (CPU) 7 will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display controller 5 will then read those frames into a buffer for the display from where they are then read out and displayed on the display panel of the display 4.

For these rendering operations to be performed, as well as the graphics processing unit 2 performing the rendering operations themselves, there is some processing that needs to be performed on the CPU (host processor) 7, for example to setup and instruct the graphics processing unit 2 to perform the appropriate rendering operation (to render the desired frames). Thus when the graphics processing unit 2 is to render a given frame, there will firstly be some processing performed on the CPU 7 for the rendering operation, and the graphics processing unit 2 will then perform the rendering operation.

When displaying a frame on the display 4, at each display "refresh", the frame to be displayed will be read out in a scan line order from a buffer storing the frame to be displayed and provided to the display panel (screen). When the end of the display scan for the current display refresh is reached, that event is signalled, such that the next frame may then be displayed.

FIG. 2 illustrates this process. As shown in FIG. 2, the display 4 includes a display panel 20 that is refreshed in a scan line order, in the present example from left to right. The data that is provided to the display panel is read out in a scan line order from a display front buffer 21 that stores the current image data (frame) to be displayed. The display 4 also indicates display events 22, such as "V-sync" to the rest of the system, for example for synchronisation purposes.

An example of a use of a data processing system such as that illustrated in FIG. 1 is to provide a virtual reality (VR) head mounted display (HMD) system.

In a head mounted virtual reality display operation, the appropriate images to be displayed to each eye will be rendered by the graphics processing unit 2, in response to appropriate commands and data from the application (e.g. executing on the CPU 7) that requires the virtual reality display. The GPU 2 will, for example, render the images to be displayed at a rate that matches the refresh rate of the display, such as 30 frames per second.

In such arrangements, the system will also operate to track the movement of the head of the user. This head orientation data is then used to determine how the images should actually be displayed to the user for their current head position (view direction), and the images (frames) are rendered accordingly (for example by setting the camera (viewpoint) orientation based on the head orientation data), so that an appropriate image based on the user's current direction of view can be displayed.

While it would be possible simply to determine the head orientation at the start of rendering a frame to be displayed in a VR system, because of latencies in the rendering process, it can be the case that the user's head orientation has changed between the sensing of the head orientation at the beginning of the rendering of the frame and the time when the frame is actually displayed (scanned out to the display panel).

To allow for this, a process known as "time warp" has been proposed for virtual reality head-mounted display systems. In this process, the frames to be displayed are rendered based on the head orientation data sensed at the beginning of the rendering of the frames, but then before the frames are actually displayed, further head orientation data is sensed, and that updated head sensor data is then used to render an "updated" version of the original frame that takes account of the updated head orientation data. The "updated" version of the frame is then displayed. This allows the image displayed on the display to more closely match the user's latest head orientation.

To do this processing, the initial, "application" frames are rendered into appropriate buffers, but there is then a second rendering process that takes image data from those buffers, applies the latest head orientation data to the image data, and renders the image data to actually be displayed into the display buffer (e.g. the display front buffer) from where it will be scanned out for display, as the display panel is refreshed.

The later rendering of the rendered application frames appropriately into the display buffer using the updated head orientation data should ideally be done as late as possible (i.e. just before the data is to be read out for display), so as to try to ensure that the images actually being displayed on the display are as accurate as possible for the user's currently determined head position.

To try to achieve this, the sampling of the latest head orientation data and the rendering of the updated frames into the display buffer is usually attempted to be performed at regular intervals, such as for "slices" of the screen refresh (e.g. at the screen refresh boundaries and half-way through the screen refresh in the scan out order).

For this processing, the graphics processing unit 2 will accordingly be required to perform two different rendering tasks, one to render the frames as required and instructed by the application, and the other to then render those rendered frames appropriately into the display buffer for scanning out for display based on the latest head orientation data.

FIG. 3 shows schematically these operations that are performed when performing such "time warp" rendering.

As discussed above, and as shown in FIG. 3, there are essentially two rendering processes that need to be performed by the GPU 2, the rendering 30 of the images (frames) that are required by the application to be displayed, and the rendering 31 of the "time warp" slices of those frames based on the latest head orientation data into the display buffer 21 for scanning out for display. Both of these rendering operations will be performed by the graphics processing unit 2 of the overall data processing system 1, under the control of the CPU 7 of the data processing system.

The CPU 7 will control the execution of the rendering tasks by the GPU 2. For each rendering task, the CPU will, for example, need to generate and submit the appropriate commands and data to the GPU for the rendering task in question. To do this, the CPU will, for example, execute an appropriate driver for the graphics processing unit 2. This driver will be executed by executing appropriate execution threads that execute the driver on the CPU.

As shown in FIG. 3, the "normal" application rendering 30 of the images required for the application will be done by the GPU based on and in response to application commands 33 received from the application on the host CPU that requires the graphics processing. (The application commands 33 will be converted to appropriate GPU commands by the GPU driver executing on the CPU.) The "application" images rendered in response to the application commands are stored in appropriate buffers 34. As shown in FIG. 3, this application rendering 30 would normally be synchronised 35 to the display frame rate, so that appropriate rendered images are available every time a new frame is required for display. This may be coordinated 36 with display events 22, such as V-sync events, signalled from the display 4.

As shown in FIG. 3, this application frame rendering 30 can be considered to be a "normal" priority task, as it should run in synchronisation with the frame rate of the display.

The time warp slice rendering 31 is also performed by the graphics processing unit 2, and operates to render appropriate images into the display buffer 21 (from where they will then be read out 23 for display). As shown in FIG. 3, the GPU renders the time warp "slices" into the display buffer 21 using the rendered application frames stored in the buffers 34, together with any other image data sources 38, such as a video camera, rendered user interface layers, etc., that may be needed/provided. It also uses appropriate head orientation (motion sensor) data and prediction 37 to try to predict the current view of the frames that should be displayed to the user (and thus rendered into the display buffer 21 for display).

As shown in FIG. 3, the time warp slice rendering operation 31 can be considered to be a "high" priority task, as it is desirable to try to ensure that this processing and the rendering of the time warp slices into the display buffer 21 is done (but still completed) as close to the time that those images will be displayed as possible, so as to provide a more realistic display to the user (and to avoid, e.g., any "tearing" of the display).

The time warp slice rendering 31 is again synchronised to display events 22, such as a V-sync event, but occurs at a higher frequency, such as four times per frame that is being displayed, so as to allow the displayed image to be updated more frequently and during the display of a given frame to the user.

Thus, as shown in FIG. 3, processor time on the CPU 7 must be respectively allocated 41 to the two rendering tasks for performing the necessary CPU (host processor) processing on the CPU for the application rendering 30 and the time warp slice rendering 31. Correspondingly, the two rendering tasks must also be appropriately provided to the GPU driver that is executing in the kernel space 39 on the host processor for appropriate scheduling 40 to the GPU 2 for those rendering tasks to be performed. There is therefore a need to be able to control and synchronise the timing of the execution of the relevant rendering task processing on the CPU 7 for both the application rendering 30 and the time warp slice rendering 31 so that those rendering operations can be completed by the GPU at and by the appropriate time to allow the desired frames to be displayed.

Furthermore, and as will be appreciated from the above, it is desirable to be able to synchronise the "time warp slice" rendering 31 as accurately and reliably with the display scan out operation 23 of the image data as possible, so as to provide a better user experience. Ideally, the rendering of the appropriate "time warp" slice into the display buffer 21 would be performed "just in time", and synchronised very tightly to the display operation, and performed with reliable timing for each and every display refresh.

However, the Applicants have found that existing mechanisms for scheduling and synchronising the execution of "time warp slice" rendering in virtual reality systems can suffer from reliability issues and may only allow more approximate synchronisation with the display operation.

The Applicants accordingly believe therefore that there is scope for improved arrangements for controlling the operation of more time critical rendering, such as when performing "time warp" rendering, in data processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
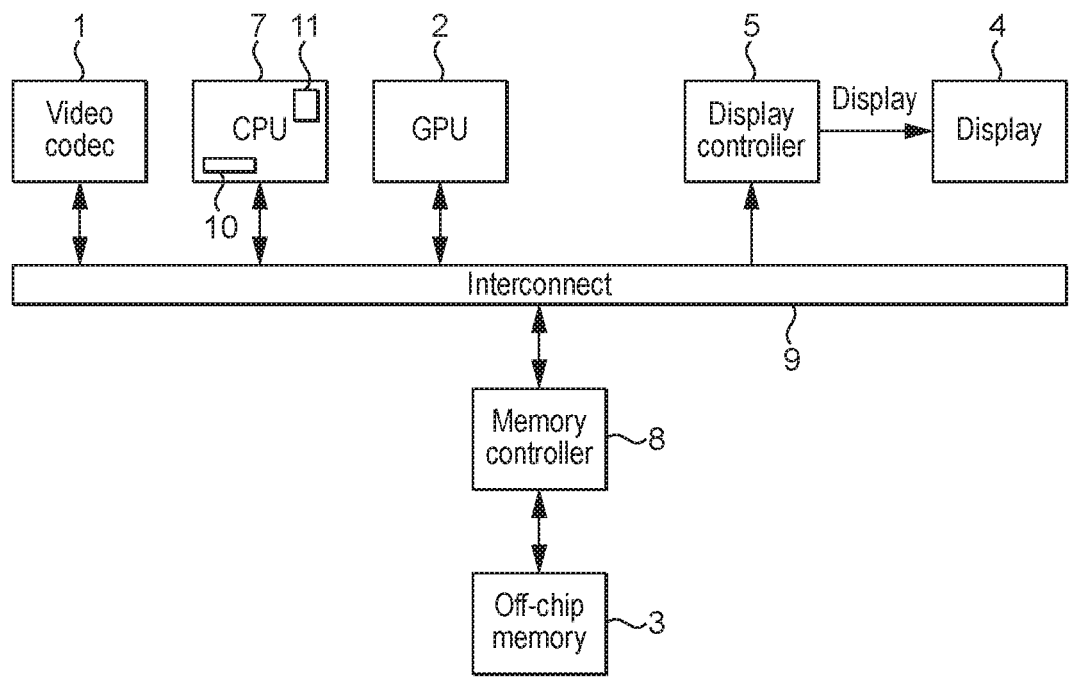
FIG. 1 shows an exemplary data processing system.
Figure 2:
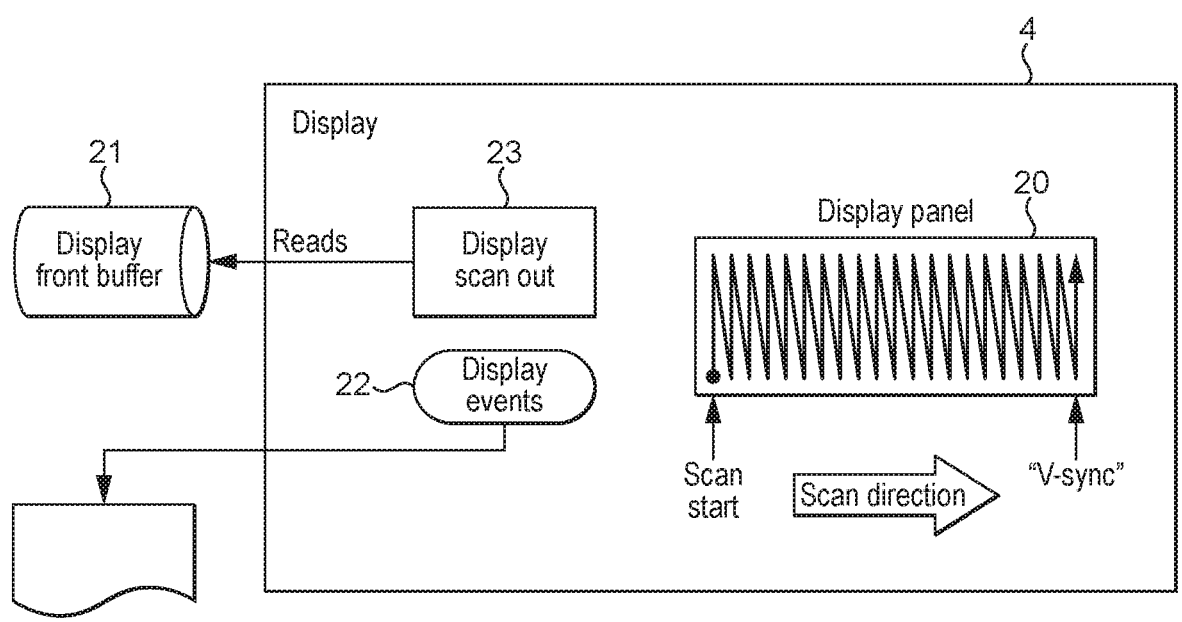
FIG. 2 shows schematically the operation of a display.
Figure 3:
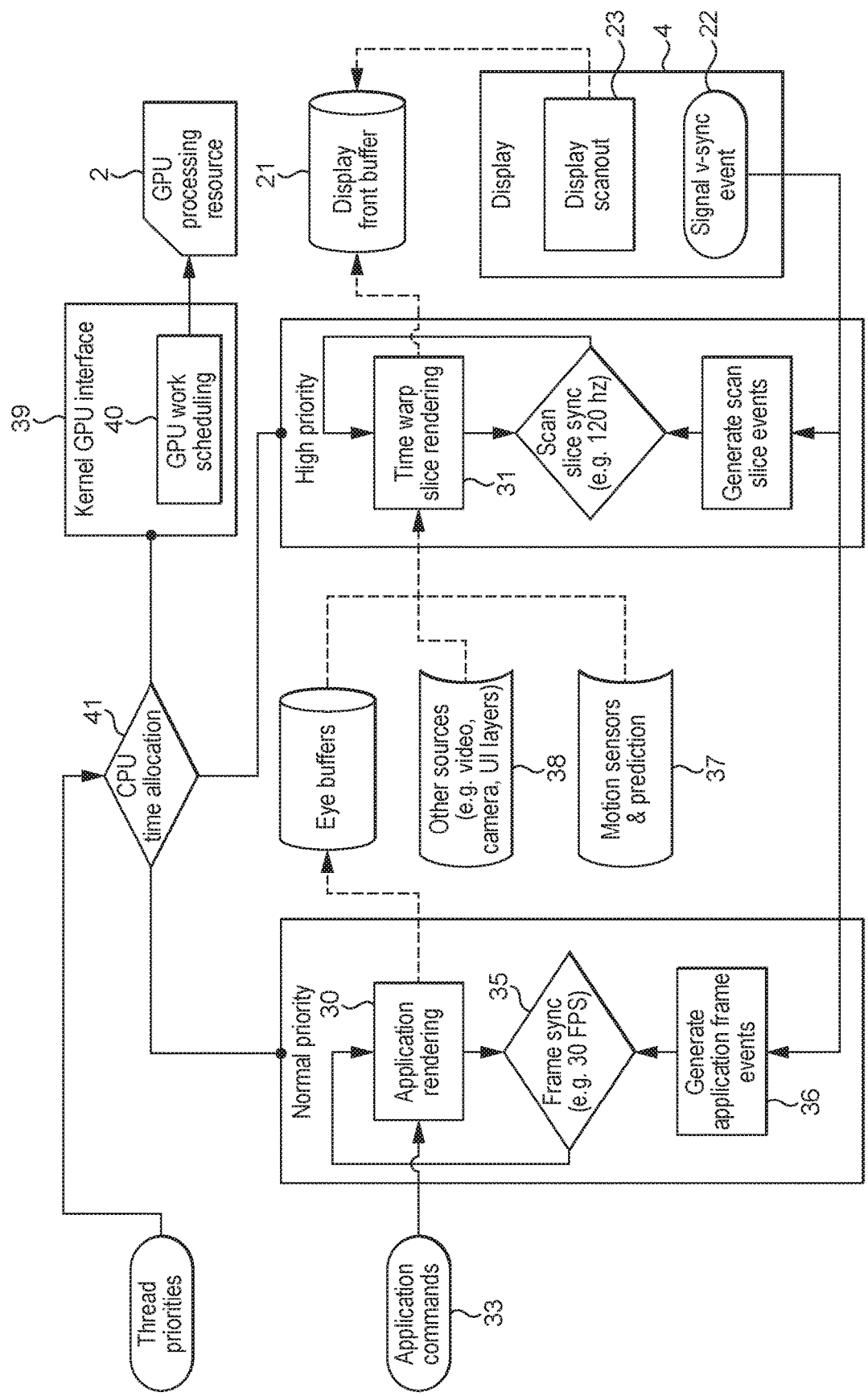
FIG. 3 shows schematically the performing of time warp slice rendering in a data processing system.

A first embodiment of the technology described herein comprises a method of operating a data processing system, the data processing system comprising:

a host processor; and a graphics processor that performs rendering tasks under the control of the host processor;

and wherein:

when the graphics processor is to perform a rendering task, the host processor first performs setup processing to allow the graphics processor to perform the rendering task and then instructs the graphics processor to perform the rendering task;

the method comprising:

when the graphics processor is to perform a rendering task, scheduling the performing of the rendering task setup processing on the host processor for the rendering task using an earliest deadline first scheduling policy.

A second embodiment of the technology described herein comprises a data processing system comprising:

a host processor; and a graphics processor that performs rendering tasks under the control of the host processor;

wherein:

when the graphics processor is to perform a rendering task, the host processor is operable to first perform setup processing to allow the graphics processor to perform the rendering task, and to then instruct the graphics processor to perform the rendering task;

and wherein:

the host processor further comprises a scheduler operable to schedule the performing of tasks on the host processor and the scheduler is operable to schedule the performing of rendering task setup processing for a rendering task on the host processor using an earliest deadline first scheduling policy.

The technology described herein relates to data processing systems in which a graphics processor is operable to perform rendering tasks under the control of a host processor. In the technology described herein, the necessary setup processing that is performed on the host processor to instruct the graphics processor to perform a rendering task is scheduled on the host processor using an earliest deadline first (least time to go) scheduling policy, i.e. a scheduling arrangement in which when an (appropriate) scheduling event occurs, the process that is closest to its deadline will be the next process scheduled for execution.

As will be discussed further below, the Applicants have recognised that using an earliest deadline first scheduling policy for scheduling the performing of rendering task setup processing on the host processor can be advantageous, in particular for rendering tasks that are more real-time service critical, such as rendering "time warp slices" in a head-mounted virtual reality display system.

In an embodiment the scheduler (the scheduling process) when using the earliest deadline first scheduling policy is also operable to reserve host processor (e.g. CPU) processing resources to perform the rendering task setup processing on the host processor. Thus, in an embodiment, as well as scheduling the performing of the rendering task setup processing on the host processor using an earliest deadline first scheduling policy, the method of the technology described herein further comprises reserving (and the scheduler is operable to reserve) processing resources on the host processor for performing the rendering task setup processing.

Correspondingly, the performing of the rendering task setup processing on the host processor for the rendering task is in an embodiment scheduled using a resource reservation earliest deadline first scheduling policy (and the scheduler on the host processor is in an embodiment operable to schedule the performing of rendering task setup processing for a rendering task on the host processor using a resource reservation earliest deadline first scheduling policy (is a resource reservation earliest deadline first scheduler)).

In an embodiment, the scheduling (scheduling processing) when using the earliest deadline first scheduling policy is operable to reserve processing resources to perform the rendering task setup processing on the host processor so as to (try to) guarantee in-principle that the host processor can perform the required rendering task setup processing by a desired deadline (e.g., and in an embodiment, within a desired period) (i.e. can meet the requested demands). Thus in an embodiment, the scheduling of the rendering task setup processing using an earliest deadline first scheduling policy further comprises making a host processor resource reservation for the performance of the rendering task setup processing on the host processor in advance, and, in an embodiment, that should guarantee (in theory) that the rendering task setup processing on the host processor will be able to be performed (and will be performed) by a given, particular deadline (e.g. within a given, particular time period).

As will be discussed further below, the Applicants have recognised that using a resource reservation earliest deadline first scheduling policy for scheduling the performing of rendering task setup processing on the host processor can be used to ensure that the rendering task setup processing is guaranteed a certain share of the host processor processing time, such that it can, in effect, be guaranteed to be able to execute in the time period during which it is required to be executed. This then means that, as will be discussed further below, this arrangement can be used to control and schedule more reliably the relevant processing for the rendering task on the host processor, thereby making it particularly suitable for controlling real-time service critical rendering tasks, such as rendering "time warp slices" in a head-mounted virtual reality display system.

The setup processing that the host processor performs to allow the graphics processor to perform a rendering task can be any suitable and desired processing that may need to be performed on the host processor for the purposes of allowing the graphics processor to perform a rendering task. In an embodiment, the rendering task setup processing comprises performing command preparation (command preparation processing) for the rendering task (preparing commands for the rendering task) on the host processor.

The rendering task setup processing that the host processor performs may, and in an embodiment does, comprise one or more of, and in an embodiment all of: submitting the graphics processing workload and any user-space driver work, such as building command buffers, on the host processor. In the case of the OpenGL API (application programming interface) this processing may, and in an embodiment does, comprise preparing the (OpenGL) context in question.

This processing can be performed in any suitable and desired manner on the host processor. In an embodiment the host processor executes a driver for the graphics processor to perform some or all of this rendering task setup processing.

The host processor can correspondingly instruct the graphics processor to perform the rendering task, once the setup processing has been completed, in any suitable and desired manner. This may, for example, and in an embodiment does, comprise interrupting the graphics processor and enqueuing the new rendering task work. Again, this may be, and is in an embodiment, done by execution of an appropriate driver for the graphics processor on the host processor.

The actual scheduling and triggering of the performing of the rendering task setup processing on the host processor using the earliest deadline first scheduling policy can be implemented and configured as desired, e.g., and in an embodiment, depending upon how the operating system executing on the host processor supports such an earliest deadline first scheduling policy. For example, in the case of the linux kernel, the earliest deadline first scheduling policy is in an embodiment implemented using the SCHED_DEADLINE feature in the linux kernel. The SCHED_DEADLINE feature in the linux kernel is a resource reservation earliest deadline first scheduler. Corresponding arrangements can be used for other operating systems.

While it would be possible for the setup processing for all rendering tasks to be performed by the graphics processor to be scheduled on the host processor using the earliest deadline first scheduling policy, in an embodiment, this is only done for certain, particular, and in an embodiment selected, rendering tasks. Thus, the rendering task setup processing will be scheduled on the host processor using an earliest deadline first scheduling policy for some rendering tasks, but not for other rendering tasks. Correspondingly, in an embodiment, the scheduler (the scheduling process) is operable to schedule the performing of rendering task setup processing on the host processor using plural different scheduling policies, one of which is an earliest deadline first schedule policy.

Correspondingly, the method in an embodiment comprises scheduling the performing of the rendering task setup processing on the host processor for at least one rendering task using the earliest deadline first scheduling policy, and scheduling the performing of the rendering task setup processing on the host processor for another rendering task using a different scheduling policy (i.e. not using the earliest deadline first scheduling policy).

In an embodiment, it can be indicated to the host processor, e.g., and in an embodiment, by the application that is requiring the graphics processing, whether a rendering task is to use the earliest deadline first scheduling policy for its setup processing on the host processor. In an embodiment this can be indicated by including an appropriate API call to cause the use of the earliest deadline first scheduling policy for the rendering task setup processing on the host processor (and, in an embodiment, to configure the use of the earliest deadline first scheduling policy for the rendering task setup processing on the host processor) in an application program. Thus, for example, and in an embodiment, a programmer will include in an application program that requires a rendering task, an API call for the rendering task indicating that the rendering task should use an earliest deadline first scheduling policy for the rendering task setup processing on the host processor.

This indication that an earliest deadline first scheduling policy should be used for the rendering task setup processing on the host processor can be provided in any suitable and desired manner, e.g. depending upon the graphics processor API that is being used. In the case of OpenGL, an extension of the EGL extension context_priority that indicates a new priority level CONTEXT_PRIORITY_REALTIME is in an embodiment used to indicate that the GL context (i.e. rendering task) in question should have its setup processing on the host processor scheduled using an earliest deadline first scheduling policy. Corresponding arrangements can be used for other graphics APIs.

As discussed above, the scheduler (the scheduling process) when using the earliest deadline first scheduling policy is in an embodiment operable to reserve host processor (CPU) processing resources to perform the rendering task setup processing on the host processor. This resource reservation should be, and is in an embodiment, based on (at least an estimate of) the host processor resources that will be needed to perform the rendering task setup processing on the host processor.

In an embodiment, the resource reservation is also or instead, and in an embodiment also, based on a given time period or periods during which the rendering task setup processing needs to be performed.

In order to allow the appropriate host processor resources for performing the rendering task setup processing to be reserved (and to determine whether those resources are available), information that is indicative of and/or that allows the required host processor resources to be determined is in an embodiment provided to the host processor. Thus, in an embodiment the scheduler (the scheduling process) when using the earliest deadline first scheduling policy is in an embodiment operable to reserve host processor (CPU) processing resources to perform the rendering task setup processing on the host processor based on information that is indicative of and/or that allows the required host processor resources to be determined (which information is in an embodiment provided to the host processor).

In an embodiment, this information comprises at least one of, and in an embodiment both of: a "budget" that is indicative of the amount of host processor time the rendering task setup processing on the host processor will use (need), and the overall time period during which the rendering task setup processing needs to be performed on the host processor.

As will be discussed further below, the rendering task whose setup processing is scheduled on the host processor using the earliest deadline first scheduling policy is in an embodiment a rendering task that is intended to be regularly repeated, such as would be the case when rendering the "time warp slices" in a head mounted virtual reality display system. Accordingly, the information that is provided to the host processor in relation to the rendering task in an embodiment indicates the length of the time period in which each repetition of the rendering task setup processing needs to be performed on the host processor (or a time period that is less than that time period (but no smaller than the amount of processor time that the rendering task setup processing on the host processor will need)), in an embodiment together with the amount of processor time that the rendering task setup processing on the host processor will need during each such time period. A smaller time period will provide a tighter scheduling guarantee, but imply a larger resource reservation. The decision on what is suitable can be, and is in an embodiment, made based on knowledge of the performance and resources, etc., of the overall system.

The period in which the host processor processing "budget" will be used is accordingly in an embodiment defined in terms of a desired (e.g. target or maximum) rate at which the rendering task is to be repeated (which in an embodiment at least corresponds to the desired (e.g. target or maximum) frame rate for the display that is being rendered).

This "budget" and "period" information can be used as desired to determine the required host processor resources and to reserve those resources, e.g. depending upon how the host processor operating system performs the earliest deadline first scheduling. For example, in the case of using the SCHED_DEADLINE feature in the linux kernel, the "budget" may be mapped to the sched_runtime parameter and the reciprocal of the desired repetition rate may be mapped to the sched_period parameter.

The "budget" is in an embodiment indicative of and corresponds to the required user space CPU time on the associated thread together with the time required to submit the rendering task workload and any user space drive work, such as building command buffers. This then facilitates making the scheduling of the initial user space work (the start of the rendering task process) more reliable and should guarantee host processor resources to ensure that that work is not delayed or stayed. The budget (and the host processor resource reservation) need not, and in an embodiment does not, include any necessary kernel-space driver time, such as for interrupting the graphics processor and enqueuing the new rendering task, nor the graphics processor time to actually execute the rendering task workload.

The budget may, e.g., be based on an assessment of the latency and/or duty cycle, etc., for the rendering task setup processing on the host processor for the data processing system in question. This may, e.g., be determined when (initially) configuring the system.

The scheduling and reservation information (the budget and period) can be provided for a rendering task in any suitable and desired manner. For example, they may already be available from other parameters or information in the system. Additionally or alternatively, they could be provided as configuration parameters for and with the rendering task in question, e.g., and in an embodiment, by the application that is requesting the rendering task. It would also be possible, if desired, to provide some dynamic control of these parameters, for example to allow the rendering task to be enabled/disabled and/or to change the period.

In an embodiment the scheduling (scheduling processing) when using the earliest deadline first scheduling policy is operable to reserve, e.g. processing resources to perform the rendering task setup processing on the host processor with the aim (intention) to guarantee in-principle that the host processor can perform the required rendering task setup processing in the period specified (i.e. can meet the requested demands).

The scheduler should accordingly, and in an embodiment does, operate to ensure that the task will be given the host processor processing resources (e.g. CPU time) for the amount of its budget every period.

In an embodiment, a determination is made as to whether sufficient host processor resources can be reserved to meet the required demands for the rendering task setup processing when a request for a rendering task that is to use the earliest deadline first scheduling policy is received by the host processor. Successful resource reservation is then in an embodiment reported back to the application in question. If the required host processor resources cannot be reserved, then in an embodiment the rendering task and its rendering task setup processing on the host processor is scheduled using a different scheduling policy, for example as a high priority rendering task that will be operable to pre-empt any lower priority rendering tasks.

In an embodiment the maximum possible resource requirement is requested at the time that the rendering task is requested (created). This then means that the rendering task can be supported and executed irrespective of how the system is actually operating (if the resource reservation is accepted) as, for example, if the system drops to a lower frame rate or stops using the rendering task in question, then that will simply have the effect that the rendering task in question will not use all of its reserved resource allocation (but the processing for the task will still be able to be performed in and by the required time). This will allow lower frame rates and variable frame rate displays, for example, to more straightforwardly be supported.

Thus, in an embodiment, there is an application executing on the host processor and the application can, and in an embodiment does, request rendering tasks to be performed by the graphics processor, and can indicate for a rendering task that is to be performed by the graphics processor, that the performing of the rendering task setup processing on the host processor should be scheduled using an earliest deadline first scheduling policy, with the host processor then being operable to recognise such a request in relation to a rendering task, and to, in response thereto, schedule the performing of the rendering task setup processing on the host processor using an earliest deadline first scheduling policy. In an embodiment, the scheduling of the rendering task setup processing on the host processor using an earliest deadline first scheduling policy includes determining whether the host processor resources necessary to perform the rendering task setup processing are available and can be reserved on the host processor, and, if so, reserving those resources on the host processor for performing the rendering task setup processing.

As well as scheduling the performing of the rendering task setup processing on the host processor using an earliest deadline first scheduling policy, in an embodiment, the timing of the execution of the performing of that rendering task setup processing on the host processor is also controlled, and in an embodiment can be configured and controlled by the application that is requesting the rendering task.

In an embodiment, the performance of the rendering task setup processing on the host processor that uses the earliest deadline first scheduling policy is triggered by the occurrence of a particular, and in an embodiment selected, in an embodiment predefined, event or events. In an embodiment, the host processor is operable to recognise the occurrence of a particular event or events (e.g., and in an embodiment, that have been defined as being events that should trigger the performing of the rendering task setup processing in question), and to, in response to those events, then perform the rendering task setup processing on the host processor.

Thus, in an embodiment, the performance of the rendering task setup processing is triggered by the host processor recognising the occurrence of a particular event or events that has been predefined as being an event that should trigger the performance of the rendering task setup processing.

The indication of the occurrence of the event or events that is to trigger the rendering task setup processing to the host processor can be achieved in any suitable and desired manner. In an embodiment, this is achieved by signalling an appropriate event or events to the host processor that the host processor can then recognise and use to trigger the performing of the rendering task setup processing accordingly.

For example, the execution thread on the host processor that is to perform the rendering task setup processing could wait on the occurrence of the particular event or events that has been predefined as being an event that should trigger the performance of the rendering task setup processing, at which point the host kernel would deschedule the thread until the relevant event is signalled. In the case of display rendering tasks operations, the display would then, e.g., raise a host processor interrupt to signal the appropriate display events to the host processor kernel, at which point the kernel would reschedule the thread to execute the rendering task setup processing. (The earliest deadline first scheduling policy would then operate to satisfy the requirements of the host thread with low latency.) Other arrangements would, of course, be possible.

The event(s) that are signalled to the host processor for this purpose can be any suitable and desired event(s) that can be identified and monitored. This may depend, for example, upon what the rendering task in question is in relation to. For example, in the case where the rendering task relates to rendering frames for a display, then in an embodiment the triggering event or events are set and configured to allow the rendering task setup processing to trigger at a specific, particular, point or points in the display scan out period. Thus, in an embodiment, the triggering event or events are or at least include, display events, such as, and in an embodiment, a V-sync event.

The rendering task setup processing triggering event or events in an embodiment include at least one hardware event that can be signalled to the host processor (e.g. V-sync in the case of a display). Where the relevant hardware element can indicate plural hardware events, then two or more hardware events can be used to trigger the relevant rendering task setup processing on the host processor.

Correspondingly, where more events are required for triggering the performing of rendering task setup processing on the host processor using the earliest deadline first scheduling policy than are available as hardware events per se (this could, e.g., be the case when performing time warp slice rendering plural times during the display scan out period (within a given frame), but the display only indicates a single hardware event, such as a V-sync event, per frame scan out), then in an embodiment other events can be generated for this purpose based on the relevant hardware event or events, e.g. in the case of a display by synthesising other events from the, e.g., hardware V-sync event (and, e.g., information relating to the refresh rate of the display).

Thus, in an embodiment, the rendering task setup processing on the host processor that is scheduled using the earliest deadline first scheduling policy is performed in response to the identification of an event that is defined as being operable to indicate that that rendering task setup processing should be performed. Correspondingly, the method in an embodiment comprises signalling a rendering task setup processing trigger event to the host processor, and the host processor then performing the rendering task setup processing that has been scheduled using the earliest deadline first scheduling policy in response to the signalling of that trigger event.

The event itself could simply be signalled to the host processor. If desired, the event could also report a time stamp (write a time stamp indicating the time of the event), if desired. A time stamp may be useful where the event itself is not signalled sufficiently accurately, but may not be necessary when the event itself can be signalled sufficiently accurately.

The relevant events that are to trigger the rendering task setup processing can be indicated and setup in the system, as desired. In an embodiment, the application that is requiring the graphics processing can, and in an embodiment does, define and setup the events that are to trigger the rendering task setup processing. In an embodiment this can be done by including appropriate API calls to create the event or events in question in the application program that requires the rendering task. Thus, for example, an application program that requires a rendering task whose rendering task setup processing is to be scheduled using an earliest deadline for scheduling policy, can, and in an embodiment does, include one or more API calls that create (and define) an event or events that can be identified by the host processor to trigger the performance of the relevant rendering task setup processing on the host processor (and, e.g., that should be signalled to the host processor).

The rendering task setup processing triggering events can be created in any suitable and desired manner, e.g. depending upon the graphics processor API that is being used. For example, where the rendering task in question relates, e.g. to a rendering task for display scan out, then in the case of Open GL a function, glFenceSyncDisplay, that operates similarly to the function glFenceSync, could be, and is in an embodiment, used to insert "markers" into the display scan out (i.e. to place appropriate markers at points in time against the time period described by the display scan out) to create the relevant triggering events in the display scan out operation. Corresponding arrangements can be used for other graphics APIs (and for other forms of event, e.g. that do not relate to display operations).

The creation of the rendering task setup processing triggering event or events should, and in an embodiment does, specify the time to signal the event. This can be done in any suitable and desired manner. For example, a progress percentage or time delta from the start of a given event (e.g. from the start of a frame) could be specified, and/or frame identifiers, such as an increasing u64 integer, together with a means of asking for the current frame identifier, could be used.

In an embodiment, the triggering event creation is operable to create a recurring event or events, and in an embodiment a set or list of recurring events, that will trigger the rendering task setup processing on the host processor for the rendering task that is scheduled using the earliest deadline first scheduling policy. Thus a set (list) of recurring events (which, e.g., in the case of rendering tasks relating to display processing in an embodiment becomes active on the next frame) can be, and is in an embodiment, created.

The recurring event or events are in an embodiment an event or events that will trigger at a given, particular, in an embodiment selected, time during a given, particular, in an embodiment selected, repeating time period (i.e. a time period that will repeat, with the event or events triggering at the particular time within each repetition of the time period in question). The time period in question can be selected as desired, and may, and in an embodiment does, relate to the rendering task in question that the recurring event or events relates to. Thus, in the case of display processing, such as time warp slice rendering, the period in which the or each recurring event is triggered is in an embodiment the period for displaying a frame (e.g. the scan out period for a frame to the display). In this case, each recurring event will trigger at its specified, particular time, once per frame.

This is a particularly convenient mechanism for creating the necessary triggering events, in particular where, as is the case in embodiments of the technology described herein, the rendering task in question that is scheduled using the earliest deadline first scheduling policy is a rendering task that is to be repeated at regular intervals, such as, for example, when rendering into a display buffer for display scan out. It allows, for example, the relevant triggering events for each time period (e.g. frame) to be created in one go, in advance, rather than having to define each such event individually. It also has the advantage of avoiding any issues in relation to which frame may be being referred to when the event or events is created.

The recurring events can be defined as desired. They are in an embodiment defined and created by defining an array of recurring, e.g. display, events, that may, e.g. be referred to by respective indices.

As well as creating the events that will trigger the rendering task setup processing (and that, e.g. will be signalled for that purpose), in an embodiment, the host processor is also operable to, and able to be configured to be operable to, recognise the occurrence (e.g. signalling) of the relevant event and to, in response thereto, trigger the performance of the rendering task setup processing.

The host processor can be configured to be responsive to the rendering task setup processing triggering events (e.g. to recognise the signalling of the triggering event and to, in response thereto, trigger the performance of the rendering task setup processing) in any suitable and desired manner. In an embodiment, the application that is requiring the graphics processing can, and in an embodiment does, setup and configure this operation of the host processor.

This is again in an embodiment done by including (using) an appropriate API call to cause this operation.

This may again be done in any suitable and desired manner for the graphics processor API that is being used. For example, in the case of Open GL, a function that corresponds to the function glClientWaitSync but that is operable to "wait" on the relevant rendering task setup processing trigger event could be, and is in an embodiment, used. Corresponding arrangements can be used for other graphics APIs.

In an embodiment the arrangement is such that the rendering task setup processing operation on the host processor will be initiated (e.g. an execution thread to perform that processing will be spawned) but the host processor will then wait for the relevant event before continuing the rendering task setup processing (the thread will wait on the event to continue its execution). Then in response to the relevant event the rendering task setup processing on the host processor will be performed (the thread will continue its execution to thereby perform the rendering task setup processing).

Thus, in an embodiment, the performing of the rendering task setup processing on the host processor is stalled (paused) until a particular, in an embodiment selected, in an embodiment predefined, event occurs (e.g. is signalled to the host processor), with the host processor then recognising that event or those events, and, in response thereto, performing the rendering task setup processing.

Thus, in an embodiment, an application executing on the host processor can, and in an embodiment does, indicate for a rendering task that is to be performed by the graphics processor and whose setup processing on the host processor is to be scheduled using the earliest deadline first scheduling policy, one or more events that should be used by the host processor to trigger the performing of the rendering task setup processing on the host processor for the rendering task, with the host processor being operable to recognise the occurrence of the event or events (and the data processing system being operable to signal the event or events to the host processor (if necessary)), and to, in response thereto, perform the rendering task setup processing on the host processor for the rendering task. In an embodiment the application can indicate a set of recurring events that will be used by the host processor to repeatedly trigger the rendering task setup processing on the host processor, e.g., and in an embodiment, at defined and/or regular intervals.

The timing of the rendering setup task processing trigger events can be selected and configured as desired. The events should be such as to trigger the rendering task setup processing on the host processor sufficiently ahead of any deadline for completing the rendering task in question, such that the rendering task should be completed by the deadline in question.

Thus, in an embodiment, the event or events that are to trigger the rendering task setup processing on the host processor is set or selected based on a deadline (e.g. time period) by which the rendering task that the rendering task setup processing on the host processor relates to needs to be completed. The deadline by which the rendering task needs to be completed can be any suitable and desired deadline for a rendering task. In the case of time warp slice rendering, for example, the deadline will be the deadline by which the relevant "time warp slice" (frame or part of the frame) to be displayed has to be available for displaying on the display as the display is refreshed (e.g. has to be rendered to the display buffer in time to be scanned out as the display is being refreshed).

Accordingly, the event or events that trigger the rendering task setup processing on the host processor are in an embodiment selected and configured so as to (try to) to ensure that the rendering task setup processing on the host processor is begun to be executed in sufficient time ahead of any deadline by which the rendering task itself needs to be completed, so as to allow the rendering task to be completed by the required deadline.

The timing of the events is also or instead (and in an embodiment also) based on the time that the rendering task setup processing on the host processor will take to complete. In an embodiment, account is also taken of the time to complete any other processing that may be required to complete the rendering task, such as other processing that may need to be done on the host processor in relation to the rendering task, and/or the processing that must be done on the graphics processor itself to perform the rendering task.

(As discussed above, the rendering task setup processing that the earliest deadline first scheduling policy is used for may not include other processing that is required for performing the rendering task, such as any processing that must be done on the graphics processor itself to perform the rendering task, and/or other processing on the host processor in relation to the rendering task, such as any necessary kernel-space driver time, such as for interrupting the graphics processor and enqueuing the rendering task workload.)

Again, the time that the rendering task setup processing on the host processor will take to complete, and the time to complete any other processing that may be required to complete the rendering task, such as any processing that must be done on the graphics processor itself to perform the rendering task, can be, and is in an embodiment, determined in advance, e.g. when configuring the data processing system, so that the events that are to trigger that processing can be set to trigger at the appropriate time.

Once the relevant triggering event has been identified by the host processor, the rendering task setup processing will be performed on the host processor in response to that event. This will use some or all (and normally all) of the relevant CPU resources (processing time) reserved by the earliest deadline first scheduling arrangement.

Once the relevant rendering task setup processing that has been scheduled using the earliest deadline first scheduling policy has been performed, then any further processing that is necessary to complete the rendering task should be, and is in an embodiment, performed appropriately. This may, and in an embodiment, does, comprise further processing on the host processor, such as, and in an embodiment, any kernel space driver processing, such as interrupting the graphics processor and enqueuing the rendering task work. It will also, and in an embodiment does also, comprise the graphics processor itself then performing the rendering task in question. This can comprise any suitable rendering processing that a graphics processor may perform, such as rasterising and rendering graphics primitives, etc.

Thus, in an embodiment, in response to the event that triggers the rendering task setup processing, the rendering task setup processing will be performed on the host processor, and then, subsequent to that rendering task setup processing, the host processor will perform further rendering task processing, submit the rendering task to the graphics processor, and the graphics processor will then perform the rendering task in question.

The rendering task whose setup processing on the host processor is scheduled using the earliest deadline first scheduling policy can be any suitable and desired rendering task that a graphics processor can perform. However, the applicants believe that the arrangements of the technology described herein are particularly suited to the performance of rendering tasks that are regular, periodic and low latency, and that have a known duty cycle. Thus, in an embodiment, the rendering task is a regular, periodic, low latency rendering task with a known duty cycle.

An example of such a rendering task is the "time warp slice" rendering for a display when providing a head mounted virtual reality display. Thus, in an embodiment, the rendering task is a rendering task for a virtual reality display system, and in an embodiment the rendering of all or part of a frame to be displayed to update the display itself, and in an embodiment "time warp slice" rendering.

The rendering of all or part of a frame to be displayed to update the display itself can comprise, e.g., and in an embodiment does comprise, rendering all or part of a frame into a display buffer (e.g. a display front buffer) for scan out to the display panel (screen). It may also comprise rendering all or part of a frame to be displayed to memory of the display itself in the case of a display that has its own memory (such that there may not be a continual hardware scan from a buffer to the display panel).

In an embodiment, the graphics processor is operable to perform (and is performing) (at least) two different rendering tasks under the control of the host processor, with the rendering task setup processing on the host processor for one of the rendering tasks being scheduled using the earliest deadline first scheduling policy, and the rendering task setup processing on the host processor for the other rendering task or tasks being scheduled using a different scheduling policy.

This will be the case where, for example, the graphics processor is performing rendering tasks for a virtual reality head mounted display system, as in that case the graphics processor will perform one or more rendering tasks to render frames for display, e.g. into appropriate frame (eye) buffers, together with periodically performing a "time warp slice" rendering task to update the actual display.

In this case, the processing for the rendering task whose rendering task setup processing on the host processor is scheduled using the earliest deadline first scheduling policy will, in effect, at the appropriate times (e.g. when the scheduling events occur) interrupt the other rendering task or tasks such that that rendering task can be performed, then once that "urgent" rendering task has been performed, the system can revert to performing or continuing to perform the other rendering task(s). In the case of rendering for the purposes of a display at least, this operation will be repeated at appropriate intervals, e.g. at least for each frame and each display update "slice".

Thus an embodiment the method comprises (and the data processing system is correspondingly configured to operate in this manner):

an application that is executing on the host processor requesting the performance of two different rendering tasks by the graphics processor;

the application indicating for one of the rendering tasks a priority level for the rendering task that indicates to the host processor that the scheduling of the performing of the rendering task setup processing on the host processor for that task should be done using an earliest deadline first scheduling policy, and a corresponding event or events that are to trigger the performance of the rendering task setup processing on the host processor for that rendering task; and the application indicating for the other of the rendering tasks a priority level that indicates to the host processor that the scheduling of the performing of the rendering task setup processing for that rendering task should be scheduled on the host processor using a different scheduling policy to the earliest deadline first scheduling policy, and a corresponding event or events that are to trigger the performance of the rendering task setup processing on the host processor for that rendering task; and the host processor in response to the requests for the rendering tasks from the application:

scheduling the performing of the rendering task setup processing on the host processor using an earliest deadline first scheduling policy for the rendering task having the priority level that corresponds to that scheduling policy, and configuring the events that are to trigger the performing of the rendering task setup processing for that rendering tasks on the host processor; and scheduling the performing of the rendering task setup processing on the host processor for the other rendering task using a different scheduling policy, and configuring the events that are to trigger the performing of the rendering task setup processing for that rendering tasks on the host processor;

and thereafter:

monitoring the occurrence of the triggering events for the rendering tasks and, in response to the occurrence of a triggering event for one of the rendering tasks, performing the rendering task setup processing for the rendering task that the triggering event relates to, and, when the rendering task setup processing on the host processor for that rendering task has been completed, instructing the graphics processor to perform the rendering task; and continuing to monitor the occurrence of the triggering events for the rendering tasks and, in response to an occurrence of a triggering event for one of the rendering tasks, performing the rendering task setup processing for the rendering task that the triggering event relates to, and, when the rendering task setup processing on the host processor for that rendering task has been completed, instructing the graphics processor to perform the rendering task.

In these embodiments, there will correspondingly be one rendering task whose rendering task setup processing on the host processor is scheduled using an earliest deadline first scheduling policy which has a first set of associated events for triggering the performance of the rendering task setup processing on the host processor for that rendering task. This rendering task is, e.g., in an embodiment the rendering of time warp slices for display, and the events that are to trigger the rendering task setup processing for this rendering task are in an embodiment configured as a set of recurring events, that are, e.g., tied to particular (and repeated) display events (e.g., and in an embodiment, points in the display scan out period).

There will correspondingly be another rendering task whose rendering task setup processing on the host processor is scheduled using a different scheduling policy which has a second set of associated events for triggering the performance of the rendering task setup processing on the host processor for that rendering task. This rendering task is, e.g., in an embodiment the rendering of "application" frames into frame buffers, e.g., and in an embodiment, at the desired frame rate. The event or events that are to trigger the rendering task setup processing for this rendering task are in an embodiment again tied to particular (and repeated) display events (e.g., and in an embodiment, the display V-sync event).

The host processor of the data processing system can be any suitable and desired host processor (CPU) for a data processing system. It should be, and is in an embodiment, operable to execute applications that may require graphics processing and a driver for the graphics processor of the data processing system. The host processor can otherwise function as desired (and include functional units as desired).

The graphics processor of the data processing system can correspondingly be any suitable and desired graphics processor that can perform rendering tasks. In an embodiment the graphics processor is a tile-based graphics processing unit, but other arrangements would be possible, if desired.

As well as the host processor and the graphics processor, the data processing system can include any other desired and suitable elements and components. Thus it may, and in an embodiment does, comprise a video codec.

In an embodiment the data processing system comprises a display and a display controller for the display. The display in an embodiment has associated with it appropriate pixel data storage where pixel data can be stored for displaying on the panel (screen) of the display. For example, the display may have (and in an embodiment does have) associated with it an appropriate display buffer (e.g. a display front buffer) from which pixel data for displaying on the panel (screen) of the display can be scanned out for display on the panel (screen) of the display. Alternatively, the display may have its own hardware buffer that, in effect, directly updates the display without the need for a continual hardware scan.

The data processing system may also comprise, and in an embodiment does also comprise, and/or is in communication with, one or more memories and/or memory devices that store the data described herein, and/or that store software for performing the processes described herein. In an embodiment the data processing system includes a main memory that can store one or more frame buffers that store output frames rendered by the graphics processor.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

It is believed that the technology described herein would be particularly applicable to virtual reality display devices such as virtual reality headsets. Another embodiment of the technology described herein comprises a virtual reality display device comprising the data processing system of any one or more of the embodiments of the technology described herein. Correspondingly, another embodiment of the technology described herein comprises a method of operating a virtual reality display device, comprising operating the virtual reality display device in the manner of any one or more of the embodiments of the technology described herein.

The technology described herein should (an in an embodiment does) produce some useful output data e.g. rendered image data for display of an image.

The various functions of the technology described herein can be carried out in any desired and suitable manner. For example, the functions of the technology described herein can be implemented in hardware or software, as desired. Thus, for example, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry. It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described. These embodiments will be described with reference to the performing of "time warp slice" rendering in a virtual reality head-mounted display system. However, as will be discussed further below, the principles and operation of the technology described herein and embodiments can correspondingly be applied to other rendering operations and tasks, if desired.

Figure 4:
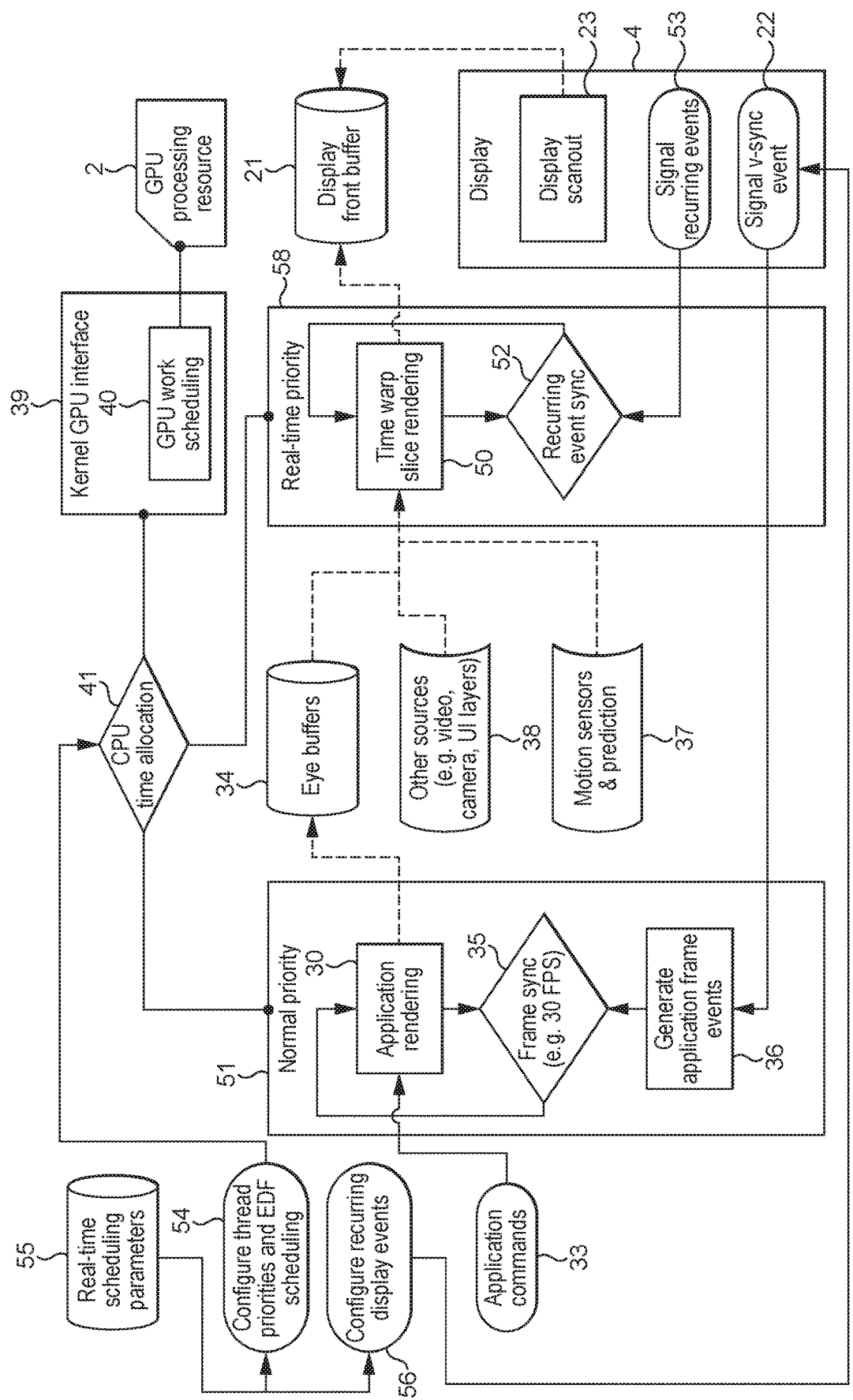
FIGS. 4 and 5 show schematically the performing of time warp slice rendering in an embodiment of the technology described herein.
Figure 5:
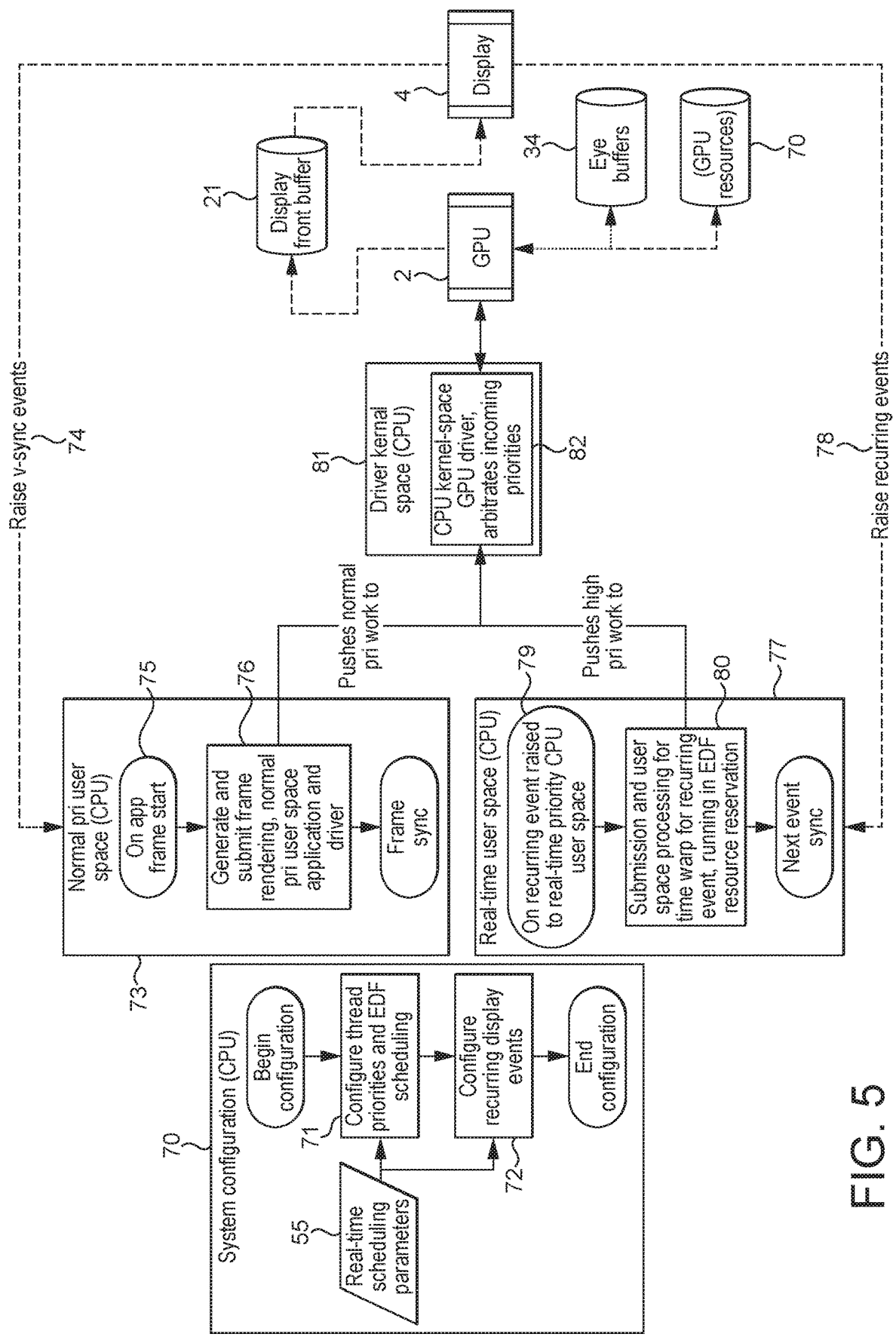

FIGS. 4 and 5 show schematically the operation of the present embodiment when performing time warp slice rendering for a virtual reality display.

The present embodiments may be implemented in a data processing system having a host processor, a graphics processor that will perform rendering tasks under the control of the host processor, and an appropriate display, such as the data processing system shown in FIG. 1.

As discussed above, an application 10, such as a game, executing on the host processor 7 will require rendering tasks to be performed by an associated graphics processing unit 2. To do this, the application will generate API (Application Programming Interface) calls that are interpreted by a driver 11 for the graphics processor 2 that is running on the host processor 7 to generate appropriate commands to the graphics processor 2 to generate graphics output required by the application 2.

In the case of "time warp slice" rendering for a virtual reality (VR) head mounted display (HMD) system, the host processor 7, will, as discussed above, control the graphics processor 2 to render respective left and right frames to be displayed at a rate corresponding to the refresh rate of the display 4 that the images are to be displayed upon, and to, in parallel with this, render all or parts of those frames to the display for display (e.g. into the display front buffer for scan out for display on the display) at appropriate intervals to try to ensure that the images displayed to the user on the display are as appropriate for the user's current head position (view direction) as possible.

For this processing, the graphics processor 2 will accordingly be required to perform two different rendering tasks, one to render the frames as required and instructed by the application, and the other to then render those rendered frames appropriately, e.g. into the display buffer for scanning out, for display based on the latest head orientation data.

FIG. 4 shows schematically these operations that are performed when performing "time warp" rendering in an embodiment of the technology described herein.

FIG. 4 shows the two rendering processes that need to be performed by the GPU 2, the rendering 30 of the images (frames) that are required by the application to be displayed, and the rendering 50 of the "time warp" slices of those frames based on the latest head orientation data 37 into the display buffer 21 for scanning out 23 for display. Both of these rendering operations will be performed by the graphics processor 2 of the overall data processing system 1, under the control of the host processor (CPU) 7 of the data processing system.

As shown in FIG. 4, the "normal" application rendering 30 of the images required for the application will be done by the graphics processor (GPU) 2 based on and in response to application commands 33 received from the application on the host processor 7 that requires the graphics processing. (The application commands 33 will be converted to appropriate GPU commands by the GPU driver 11 executing on the CPU 7.) The "application" images rendered in response to the application commands are stored in appropriate buffers 34.

As shown in FIG. 4, this "application" rendering 30 is synchronised 35 to the display frame rate, so that appropriate rendered images are available every time a new frame is required for display (the display is refreshed). This is achieved by coordinating 36 the application rendering with display V-sync events 22 signalled from the display 4.

As shown in FIG. 4, this application frame rendering 30 is treated as a "normal" priority task 51 in terms of its scheduling on the host processor 7.

The time warp slice rendering 50 is also performed by the graphics processing unit 2, and operates to render appropriate images (pixel data) into the display buffer 21 for the display 4 for scanning out 23 as the display panel is being refreshed. As shown in FIG. 4, the GPU 2 renders the time warp "slices" into the display buffer 21 using the rendered application frames stored in the buffers 34, together with any other image data sources 38, such as a video camera, rendered user interface layers, etc., that may be needed/ provided. It also uses appropriate head orientation (motion sensor) data and prediction 37 to try to predict the current view of the application frames that should be displayed to the user (and thus rendered into the display buffer 21 for display).

As shown in FIG. 4, the time warp slice rendering operation 50 is effected in the present embodiment as a "real time" priority task 58. The process for achieving this will be discussed in more detail below. This is done to try to ensure that this processing and the rendering of the "time warp slices" into the display buffer 21 can be done as close to the time that those images will be displayed as possible, so as to provide a more realistic display to the user, and to avoid, e.g., any "tearing" of the display.

As also shown in FIG. 4, the time warp slice rendering 50 is again synchronised to events from the display 4. However, as will be discussed in more detail below, the time warp slice rendering task is synchronised to specific, recurring events 53 that are defined and set up for this purpose.

As shown in FIG. 4, processor time on the CPU 7 for performing the necessary CPU (host processor) processing on the CPU for the application rendering 30 and the time warp slice rendering 50 is respectively allocated 41 to those two rendering tasks. Correspondingly, the two rendering tasks are appropriately provided to the GPU driver that is executing in the kernel space 39 on the host processor for appropriate scheduling 40 to the GPU 2 for those rendering tasks to be performed.

In the present embodiment, time warp slice rendering 50 is effected as "real time" priority task by using an earliest deadline first scheduling policy to schedule the rendering task setup processing that must be performed on the host processor 7 for that rendering task. In the present embodiment, this is achieved by the use of the SCHED_DEADLINE feature of the linux kernel. This provides an earliest deadline first scheduling policy which offers an in-principle guarantee that the requested host processor resource can be reserved and will be provided in order to meet the deadline (so long as sufficient resource can be reserved).

The requirement to effect the time warp slice rendering as a "real time" priority task is indicated to the host processor 7 by the application that requires the time warp slice rendering using an API call to establish the "real time" priority context (rendering task). In the present embodiment this is done using a new priority level CONTEXT_PRIORITY_REALTIME for the OpenGL EGL extension, context_priority.

(The present embodiment is described with reference to the use of the OpenGL API. Corresponding arrangements can be used for other graphics APIs.)

When the host processor 7 sees this CONTEXT_PRIORITY_REALTIME API call in an application program, it recognises that the corresponding rendering task should be configured as a "real time" priority task. It accordingly operates to configure the thread priorities and scheduling for the rendering task setup processing on the host processor for that rendering task using the SCHED_DEADLINE feature of the linux kernel.

To do this, the host processor 7 also makes use of "real time" scheduling parameters 55. In the present embodiment, these parameters comprise a "budget" and a "period".

The budget is the amount of host processor CPU time the real time rendering task (context) will consume every frame. This is mapped to the sched_runtime parameter of the SCHED_DEADLINE feature.

In the present embodiment, the budget is configured so as to request the maximum possible needed resource reservation at the time of the real time rendering task (context) creation. This then straightforwardly allows the operation to support lower frame rates or variable frame rate displays, as if the frame rate is reduced, that will simply correspond to not using all of the reserved resource allocation.

In the present embodiment, the budget represents the user-space host processor CPU time that will be required for the associated thread that executes the rendering task setup processing on the host processor 7. This budget thus covers the time required to submit the rendering task workload (the gl workload) and any user space driver work, such as building command buffers (but does not include any necessary kernel-space driver time, such as interrupting the GPU and enqueuing the new work) and accordingly makes the scheduling of the initial user space work (the start of the process) more reliable and guarantees a regular time slice to ensure that that work is not delayed or stayed.

The "period" of the real time scheduling parameters 55 represents the period in which the "budget" will be used. In the present embodiment, the period is expressed in terms of the target or maximum frame rate to be met. The reciprocal of this value is mapped to the sched_period parameter of the SCHED_DEADLINE feature of the linux kernel.

In the present embodiment, the budget and target or maximum frame rate parameters are provided as additional configuration parameters for the "real time" context (rendering task) in question. Other arrangements for this would be possible.

In response to the request for the "real time" priority context, and based on the real time scheduling parameters 55, the host processor 7 determines whether it can reserve sufficient host processor resources to be able to provide the relevant "real time" rendering task setup processing on the host CPU by the required deadline.

If it is determined that relevant CPU 7 resources can be reserved, that is reported back through the successful creation of the "real time" rendering task (context). If the resource reservation is not possible, then in the present embodiment the time warp slice rendering task is instead configured as a lower priority level task (context), e.g. as a "high" priority rendering task (context).

As well as configuring the scheduling of the rendering task setup processing using the earliest deadline first, SCHED_DEADLINE, scheduling feature, as discussed above, and as shown in FIG. 4, one or more display events 53 that will be used to trigger 52 the time warp slice rendering task setup processing on the host processor 7 are set up (configured).

These display events are configured in the present embodiment as recurring display events that will operate to trigger the performance of the time warp slice rendering task setup processing on the host processor 7.

The recurring display events 53 are set to allow the "real time" priority time warp slice rendering task setup processing on the host processor 7 to be triggered at specific points in the scan out period 23 of the display 4. They are specified as a set of scan progress points that the time warp slice rendering task setup processing will wait on to trigger that processing. Thus, the "real time" context thread that is to execute the rendering task setup processing waits on these recurring events, and when they are signalled 53, executes the appropriate rendering task setup processing for the time warp slice rendering to be performed at that time.

The recurring display events 53 that trigger the real time rendering task setup processing for the time warp slice rendering task are in the present embodiment based on the vsync hardware event from the display 4. Where the display 4 can signal more than one hardware event, then in an embodiment plural, and in an embodiment each, of the hardware events that display 4 can signal are used to configure the recurring display events 53. If more recurring display events than hardware events that can be signalled by the display 4 are required, then the additional events can be synthesised as desired, e.g. based on the hardware events, such as the vsync event, that can be signalled by the display 4 and other information, e.g. relating, e.g., to the refresh rate of the display 4.

The timing of the recurring display events 53 that are used to trigger the "real time" rendering task setup processing takes account in the present embodiment both of the time that will be required to perform that rendering task setup processing on the CPU, and any other necessary CPU processing, such as any necessary kernel-space driver time, such as for interrupting the GPU 2 and enqueuing the new work, and the GPU time to actually execute the time warp slice rendering task workload.

In the present embodiment, a function, glFenceSyncDisplay, that operates similarly to the function glFenceSync, but is inserted into the display scan out, is used to configure the recurring display events 53 for the time warp slice rendering. This function is called by the application that requires the time warp slice rendering to configure and setup the recurring display events that will trigger the rendering task setup processing for the time warp slice rendering on the host processor 7.

This API function creates (or modifies) a list of recurring events (fences), which become active on the next frame, as array of recurring display events, referred to by index, and in the present embodiment has the form:

```
GLboolean glFenceSyncDisplay(GLsizei number_of_fences,
    GLfloat* fence_location_array)
```

This instructs the host processor to create a set of events (fences) at specified locations. In this example, floats are used, and 0 . . . 1 as the range. Any call of this function implies the automatic destruction of any existing display events (fences). Calling this function with 0 for the number_of_fences has the effect of deleting all display events (fences).

As well as this function, the following API function is also made available:

```
MAX_FENCE_SYNC_DISPLAY_LOCATIONS
```

This sets the maximum allowable value of number_of_fences (events) in the implementation.

As well as the above API functions for allowing the creation of the recurring events, the following API function is provided to allow the execution of the rendering task setup processing for the time warp slice rendering on the host processor to wait for the appropriate display event:

```
GLenum glClientWaitSyncDisplay(GLint fence_index, GLbitfield
    flags, GLuint64 timeout)
```

In the present embodiment, this function can support nearly the same return codes as glClientSyncWait, with the exception that 'already signalled' is not well defined for recurring fences (events). It can also indicate that an event (fence) was deleted before it could be raised (e.g. as a result of another call to glFenceSyncDisplay), e.g. through the 'wait failed' return code or the use of a new return code, such as 'fence invalidated'.

Other arrangements could, of course, be used.

It will be appreciated from the above that in the present embodiment, the application that requires the time warp slice rendering 50 (and the application rendering 30) will include in respect of the time warp slice rendering 50 that is to be performed, both an API function call to establish the "real time" priority rendering task for performing that time warp slice rendering, and API function calls to configure the recurring display events that will trigger that "real time" rendering task processing.

A suitable pseudocode example for this, in the case of the OpenGL API, is shown below:

```
// A timewarp implementation (the real time priority context part),
// This is all assumed to be running on a separate thread to the application.
// attributes to request a realtime context
static EGLint const context_attribute_list[ ] = {
        EGL_CONTEXT_PRIORITY_LEVEL, EGL_CONTEXT_PRIORITY_REALTIME,
        ...
        EGL_NONE
};
// fences (events) at half way and vsync
static GLfloat const fence_interval_list[ ] = { 0.5f, 1.f };
// create the context
EGLContext context;
context = eglCreateContext(display, config, EGL_NO_CONTEXT,
contex_attribute_list);
// check context has attribute REALTIME to check it has this capability, else
fallback.
// create the fences (events) and make the resource reservation.
GLboolean ok_made_reservation = setContextReservation(budget, target_fps);
// at this point (after the reservation has been specified), this thread must not
// consume
// more than it's requested CPU allocation
// and so should either sleep until ready or wait on the first fence sooner rather than
// later.
// If the thread goes on to do more work than it requested it will be swapped out by
// the kernel until the next period.
// Create the fences (events). These won't become active until the next frame.
GLboolean ok_create_fences = glFenceSyncDisplay(2, fence_interval_list);
// now enter the main loop
GLenum fence_signal = 0;
for (int eye = 1; eye = eye % 2; ++eye) {
    fence _signal = glClientWaitSyncDisplay(eye, flags, timeout);
    if (fence_signal != GL_CONDITION_SATISFIED)
        break;
    // this part, and the corresponding driver work is what our allocation is for
    submitTimewarp( );
}
```

FIG. 5 shows schematically the sequence of operations when performing time warp slice rendering in the present embodiment.

As shown in FIG. 5, in response to recognising the appropriate API calls discussed above, the host processor 7 will first perform the necessary configuration operations 70 to facilitate the "real time" time warp slice rendering operation.

As shown in FIG. 5, this process comprises configuring the thread priorities and earliest deadline first scheduling for the thread or threads on the host processor that will execute the time warp slice rendering task setup processing on the host processor (step 71), and configuring the recurring display events that will trigger the relevant time warp slice rendering setup processing (step 72). As discussed above, these operations will use the real time scheduling parameters 55 that have been defined for the time warp slice rendering task.

Once the system configuration 70 has been completed, the rendering operations can be performed.

As shown in FIG. 5, and as discussed above, for both the application rendering 30 and the time warp slice rendering 50 rendering tasks, there will be some rendering task setup processing that is performed on the host processor 7 to set up the rendering task for submission to the graphics processor 2 for the graphics processor 2 to perform that rendering task.

As shown in FIG. 5, the application rendering 30 rendering task setup processing 73 is performed in "normal" priority user space on the host processor 7 and is triggered by the V-sync events 74 signalled by the display 4. Thus, when the V-sync event indicates that a new application frame is required (step 75), the host processor will operate to generate and submit the relevant application frame rendering workload for the graphics processor 2 by executing the relevant application and driver user space processing in "normal" priority user space (step 76).

Correspondingly, the rendering task setup processing 77 for the time warp slice rendering is performed in "real time" user space on the host processor 7 in response to the signalling 78 of the configured recurring display events signalled from the display 4. When an appropriate recurring display event that has been set up for the purpose of the real time priority time warp slice rendering task occurs (step 79), the real time priority rendering time warp slice rendering task setup processing is performed on the host processor, running in the earliest deadline first resource reservation that has been established for that purpose (step 80).

As shown in FIG. 5, for both the normal priority application rendering and the real time time warp slice rendering, once the relevant rendering task setup processing in the user space on the host processor 7 has been performed, the work for those tasks is submitted to the graphics processor driver executing in the kernel space 81 on the host processor 7.

The kernel space GPU driver receives the relevant rendering workloads and arbitrates between them based on their incoming priorities (step 82). Thus when the driver receives the high priority, real time workload for the time warp slice rendering, it recognises that fact and interrupts any "normal" priority rendering work on the GPU 2 and submits the real time priority workload to the GPU so that it will perform the time warp slice rendering. Once the GPU has completed that time warp slice rendering, then the driver executing in kernel space will submit any application rendering that is to be done to the GPU 2 for processing.

This operation continues in response to the corresponding display events, such that the GPU 2 will continue to render the application frames at the required frame rate (display refresh rate) but that rendering will periodically and recurringly be interrupted to perform the time warp slice rendering in response to the recurring display events that have been established to trigger the time warp slice rendering.

A number of variations and modifications, etc., would be possible to the above embodiments, if desired.

For example, although the present embodiment has been described with reference to OpenGL EGL/GLES, the principles of the technology described herein can correspondingly be used for other graphics APIs, such as Vulkan, if desired.

Similarly, although the above embodiment shows arrangements in which the display 4 has a display front buffer 21 in which pixel data is stored for scan out for display, the technology described herein and the present embodiment can correspondingly be used for displays that use double buffering instead, and for displays that have their own memory and are capable of supporting partial updates rather than continually scanning. In the latter case, there may not, in effect, be a continual hardware scan from the buffer to the display panel, but rather the update of the display memory will effectively correspond directly to a display update on the panel. In this case therefore the time warp slice rendering task would effectively render the pixel data directly to the display memory to, in effect, update the panel directly, rather than writing that data into a buffer from where it is then scanned out to the display panel.

The rendering task setup processing that is performed on the host processor for the time warp slice rendering task should comprise any appropriate and necessary processing for the rendering task that needs to be performed by the host processor. Thus this may comprise, e.g., constructing the command buffer for the time warp slice rendering task on the graphics processor. However, where that command buffer may be constructed in advance, it may be that the processing on the CPU 7 for the time warp slice rendering task needs only submit the work itself to the GPU 2.

Correspondingly, the rendering task setup processing for the time warp slice rendering task on the host processor may comprise sampling the head orientation data and including it in the commands that it issues to the GPU 2. Alternatively, where the rendering task setup processing only submits the work to the GPU 2 (but does not itself operate to construct the command buffer for the time warp slice rendering work on the graphics processor 2), then the head orientation data may be made available to the graphics processor 2 via another means, such as through an external resource (such as an external texture).

Equally, where the work that the host processor is providing to the graphics processor is pre-compiled (i.e. the graphics processor is, in effect, executing previously compiled instructions but processing different data), then again the rendering task setup processing may comprise simply updating the head orientation data in a buffer for use by the graphics processor 2.

Correspondingly, the rendering work that is performed for the time warp slice rendering task on the graphics processor 2 may and should comprise any rendering work that is necessary to render the time warp slices into the display buffer (e.g.) for scan out, e.g. based on, and taking account, of any prior rendering processing that may have been done in relation to the frame or frames in question.

Although the above embodiment shows the time warp slice rendering 50 interrupting the application rendering 30 on the graphics processor 2, when it is possible to reserve appropriate points in the graphics processor's processing for performing the time warp slice rendering, the time warp slice rendering could be interleaved with the "normal" application rendering on the graphics processor 2, rather than having to interrupt the "normal" application rendering on the graphics processor 2.

Although the present embodiments have been described above with particular reference to time warp slice rendering for a virtual reality head mounted display system, the operation of the present embodiment (and of the technology described herein) can be used for other rendering tasks as desired. Indeed, it is believed that the present embodiments and the technology described herein will generally be useful and advantageous for the performance of regular, periodic, low latency rendering task work that has a known duty cycle. Time warp slice rendering for a virtual reality application is one example of such rendering work.

It can be seen from the above that the technology described herein, in embodiments, comprises a mechanism for more reliably scheduling and performing rendering tasks in a data processing system in a real time and service-critical manner.

This is achieved in embodiments of the technology described herein, by scheduling the setup processing for a rendering task that the host processor must perform using an earliest deadline first scheduling policy, and, in an embodiment, by establishing a set of recurring events to trigger that rendering task setup processing.

The foregoing detailed description has been presented for the purpose of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilised the technology in various embodiments and with various modifications as are suited to the particular use contemplated. It is intended that the scope be define by the claims appended hereto.

The invention claimed is:

1. A method of operating a data processing system, the data processing system comprising:
  a host processor; and
  a graphics processor that performs rendering tasks under the control of the host processor;
  and wherein:
  when the graphics processor is to perform a rendering task, the host processor first performs setup processing to allow the graphics processor to perform the rendering task, wherein the setup processing comprises the host processor generating commands for the rendering task, and wherein once the setup processing has been completed the host processor then instructs the graphics processor to perform the rendering task;
  the method comprising:
  when the graphics processor is to perform a rendering task, scheduling the performing of the rendering task setup processing on the host processor for the rendering task comprising generating commands for the rendering task using an earliest deadline first scheduling policy;
  when scheduling the performing of the rendering task setup processing on the host processor for the rendering task using the earliest deadline first scheduling policy, reserving processing resources on the host processor for performing the rendering task setup processing based on an amount of host processor time required for performing the rendering task setup processing; and
  once the setup processing has been completed by the host processor, the host processor instructing the graphics processor to perform the rendering task.

2. The method of claim 1, wherein the earliest deadline first scheduling policy is implemented using the SCHED_DEADLINE feature of the linux kernel.

3. The method of claim 1, comprising:
  an application executing on the host processor requesting a rendering task to be performed by the graphics processor, and indicating to the host processor that the rendering task setup processing on the host processor for that rendering task should be scheduled using an earliest deadline first scheduling policy; and the host processor, in response thereto, scheduling the performing of the rendering task setup processing for the rendering task on the host processor using an earliest deadline first scheduling policy.

4. The method of claim 1, further comprising:
  the host processor performing the rendering task setup processing on the host processor that has been scheduled using the earliest deadline first scheduling policy in response to the occurrence of a corresponding trigger event or events.

5. The method of claim 4, comprising:
  defining a set of at least one recurring event that will trigger the performance of the rendering task setup processing on the host processor that is scheduled using the earliest deadline first scheduling policy each time an event in the set of at least one recurring events occurs.

6. The method of claim 5, wherein the recurring event or events are an event or events that will occur at a given time during each occurrence of a particular repeating time period.

7. The method of claim 4, wherein the rendering task whose setup processing on the host processor is scheduled using the earliest deadline first scheduling policy is the rendering of a part of a frame to be displayed to update a display in a virtual reality display system based on orientation data.

8. The method of claim 7, comprising:
  using an event or events that relates to the display scan out operation to trigger the rendering task setup processing on the host processor that is scheduled using an earliest deadline first scheduling policy.

9. The method of claim 4, comprising:
  an application that is executing on the host processor requesting the performance of two different rendering tasks by the graphics processor;
  the application indicating for one of the rendering tasks a priority level for the rendering task that indicates to the host processor that the scheduling of the performing of the rendering task setup processing on the host processor for that task should be done using an earliest deadline first scheduling policy and a corresponding event or events that are to trigger the performance of the rendering task setup processing on the host processor for that rendering task; and
  the application indicating for the other of the rendering tasks a priority level that indicates to the host processor that the scheduling of the performing of the rendering task setup processing for that rendering task should be scheduled on the host processor using a different scheduling policy to the earliest deadline first scheduling policy and a corresponding event or events that are to trigger the performance of the rendering task setup processing on the host processor for that rendering task; and
  the host processor in response to the requests for the rendering tasks from the application:
    scheduling the performing of the rendering task setup processing on the host processor using an earliest deadline first scheduling policy for the rendering task having the priority level that corresponds to that scheduling policy, and configuring the events that are to trigger the performing of the rendering task setup processing for that rendering tasks on the host processor; and
    scheduling the performing of the rendering task setup processing on the host processor for the other rendering task using a different scheduling policy, and configuring the events that are to trigger the performing of the rendering task setup processing for that rendering tasks on the host processor;

and thereafter:

monitoring the occurrence of the triggering events for the rendering tasks and, in response to the occurrence of a triggering event for one of the rendering tasks, performing the rendering task setup processing for the rendering task that the triggering event relates to, and, when the rendering task setup processing on the host processor for that rendering task has been completed, instructing the graphics processor to perform the rendering task; and continuing to monitor the occurrence of the triggering events for the rendering tasks and, in response to an occurrence of a triggering event for one of the rendering tasks, performing the rendering task setup processing for the rendering task that the triggering event relates to, and, when the rendering task setup processing on the host processor for that rendering task has been completed, instructing the graphics processor to perform the rendering task.

10. A data processing system comprising:

a host processor; and a graphics processor that performs rendering tasks under the control of the host processor;

wherein:

when the graphics processor is to perform a rendering task, the host processor is operable to first perform setup processing to allow the graphics processor to perform the rendering task, wherein the setup processing comprises the host processor generating commands for the rendering task, and wherein the host processor is operable once the setup processing has been completed to then instruct the graphics processor to perform the rendering task;

and wherein:

the host processor further comprises a scheduler operable to schedule the performing of tasks on the host processor and the scheduler is operable to schedule the performing of rendering task setup processing for a rendering task comprising generating commands for the rendering task on the host processor using an earliest deadline first scheduling policy;

wherein the scheduler is further operable to, when scheduling the performing of the rendering task setup processing on the host processor for the rendering task using an earliest deadline first scheduling policy, reserve processing resources on the host processor for performing the rendering task setup processing based on an amount of host processor time required for performing the rendering task setup processing.

11. The system of claim 10, wherein the earliest deadline first scheduling policy is implemented using the SCHED_DEADLINE feature of the linux kernel.

12. The system of claim 10, wherein the:

host processor is operable to:

recognise an indication from an application executing on the host processor requesting a rendering task to be performed by the graphics processor that the rendering task setup processing on the host processor for that rendering task should be scheduled using an earliest deadline first scheduling policy;

and to, in response thereto:

schedule the performing of the rendering task setup processing for the rendering task on the host processor using an earliest deadline first scheduling policy.

13. The system of claim 10, wherein the host processor is operable to:

perform the rendering task setup processing on the host processor that has been scheduled using the earliest deadline first scheduling policy in response to the occurrence of a corresponding trigger event or events.

14. The system of claim 10, wherein:

a set of at least one recurring event that will trigger the performance of the rendering task setup processing on the host processor for the rendering task that is scheduled using the earliest deadline first scheduling policy each time an event in the set of at least one recurring event occurs is defined.

15. The system of claim 14, wherein the recurring event or events are an event or events that will occur at a given time during each occurrence of a particular repeating time period.

16. The system of claim 10, wherein the rendering task whose setup processing on the host processor is scheduled using the earliest deadline first scheduling policy is the rendering of a part of a frame to be displayed to update a display in a virtual reality display system based on orientation data.

17. The system of claim 16, wherein:

an event or events that relates to the display scan out operation is used to trigger the rendering task setup processing on the host processor that is scheduled using an earliest deadline first scheduling policy.

18. The system of claim 10, wherein the host processor is operable to:

in response an application that is executing on the host processor requesting the performance of two different rendering tasks by the graphics processor;

the application indicating for one of the rendering tasks a priority level for the rendering task that indicates to the host processor that the scheduling of the performing of the rendering task setup processing on the host processor for that task should be done using an earliest deadline first scheduling policy and a corresponding event or events that are to trigger the performance of the rendering task setup processing on the host processor for that rendering task; and the application indicating for the other of the rendering tasks a priority level that indicates to the host processor that the scheduling of the performing of the rendering task setup processing for that rendering task should be scheduled on the host processor using a different scheduling policy to the earliest deadline first scheduling policy and a corresponding event or events that are to trigger the performance of the rendering task setup processing on the host processor for that rendering task:

schedule the performing of the rendering task setup processing on the host processor using an earliest deadline first scheduling policy for the rendering task having the priority level that corresponds to that scheduling policy, and configure the events that are to trigger the performing of the rendering task setup processing for that rendering tasks on the host processor; and schedule the performing of the rendering task setup processing on the host processor for the other rendering task using a different scheduling policy, and configure the events that are to trigger the performing of the rendering task setup processing for that rendering tasks on the host processor;

and to thereafter:

monitor the occurrence of the triggering events for the rendering tasks and, in response to the occurrence of a triggering event for one of the rendering tasks, perform the rendering task setup processing for the rendering task that the triggering event relates to, and, when the rendering task setup processing on the host processor for that rendering task has been completed, instruct the graphics processor to perform the rendering task; and continue to monitor the occurrence of the triggering events for the rendering tasks and, in response to an occurrence of a triggering event for one of the rendering tasks, perform the rendering task setup processing for the rendering task that the triggering event relates to, and, when the rendering task setup processing on the host processor for that rendering task has been completed, instruct the graphics processor to perform the rendering task.

19. The system of claim 10, wherein the system is part of a virtual reality display device.

20. A non-transitory computer storage medium storing computer software code when executing on a processor performs a method of operating a data processing system, the data processing system comprising:

a host processor; and a graphics processor that performs rendering tasks under the control of the host processor;

and wherein:

when the graphics processor is to perform a rendering task, the host processor first performs setup processing to allow the graphics processor to perform the rendering task, wherein the setup processing comprises the host processor generating commands for the rendering task, and wherein once the setup processing has been completed the host processor then instructs the graphics processor to perform the rendering task;

the method comprising:

when the graphics processor is to perform a rendering task, scheduling the performing of the rendering task setup processing on the host processor for the rendering task comprising generating commands for the rendering task using the earliest deadline first scheduling policy;

when scheduling the performing of the rendering task setup processing on the host processor for the rendering task using an earliest deadline first scheduling policy, reserving processing resources on the host processor for performing the rendering task setup processing based on an amount of host processor time required for performing the rendering task setup processing; and once the setup processing has been completed by the host processor, the host processor instructing the graphics processor to perform the rendering task.

\* \* \* \* \*

UNITED STATES PATENT AND TRADEMARK OFFICE
CERTIFICATE OF CORRECTION

PATENT NO. : 10,936,365 B2
APPLICATION NO. : 16/062952
DATED : March 2, 2021
INVENTOR(S) : Martin et al.

Page 1 of 1

It is certified that error appears in the above-identified patent and that said Letters Patent is hereby corrected as shown below:

In the Claims

Column 28, Line 11 (Claim 5, Line 1), please change "claim 4" to -- claim 1 --.

Column 28, Line 21 (Claim 7, Line 1), please change "claim 4" to -- claim 1 --.

Column 28, Line 32 (Claim 9, Line 1), please change "claim 4" to -- claim 1 --.

Column 28, Line 63 (Claim 9, Line 32), please change "tasks" to -- task --.

Column 29, Line 3 (Claim 9, Line 39), please change "tasks" to -- task --.

Column 30, Line 62 (Claim 18, Line 30), please change "tasks" to -- task --.

Column 31, Line 2 (Claim 18, Line 37), please change "tasks" to -- task --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*